(12) United States Patent
Creati et al.

(10) Patent No.: US 10,961,129 B2
(45) Date of Patent: Mar. 30, 2021

(54) ADJUSTING METHOD AND SYSTEM FOR DISPENSING CHEMICAL PRODUCTS

(71) Applicant: SEKO S.p.A., Cittaducale (IT)

(72) Inventors: Cristian Creati, Santa Rufina (IT); Luigino Esposito, Santa Rufina (IT); Adrio Pantaleoni, Santa Rufina (IT)

(73) Assignee: SEKO S.p.A., Santa Rufina (IT)

( * ) Notice: Subject to any disclaimer, the term of this patent is extended or adjusted under 35 U.S.C. 154(b) by 64 days.

(21) Appl. No.: 16/346,836

(22) PCT Filed: Nov. 3, 2017

(86) PCT No.: PCT/IB2017/056897
§ 371 (c)(1),
(2) Date: May 1, 2019

(87) PCT Pub. No.: WO2018/083665
PCT Pub. Date: May 11, 2018

(65) Prior Publication Data
US 2020/0055742 A1 Feb. 20, 2020

(30) Foreign Application Priority Data
Nov. 3, 2016 (IT) .................. 102016000110606

(51) Int. Cl.
*C02F 1/00* (2006.01)
*C02F 1/68* (2006.01)
*C02F 103/42* (2006.01)

(52) U.S. Cl.
CPC .............. *C02F 1/008* (2013.01); *C02F 1/685* (2013.01); *C02F 2103/42* (2013.01);
(Continued)

(58) Field of Classification Search
CPC .............. C02F 1/008; C02F 1/685–688; C02F 2103/42; C02F 2209/003; C02F 2209/006; C02F 2209/40; C02F 2301/046
See application file for complete search history.

(56) References Cited

U.S. PATENT DOCUMENTS

2009/0200245 A1\* 8/2009 Steinbrueck ............ C02F 1/008
210/741
2017/0008784 A1\* 1/2017 Shimpo .................. F22B 37/025
(Continued)

FOREIGN PATENT DOCUMENTS

WO 2011/143736 A1 11/2011

*Primary Examiner* — Terry K Cecil
(74) *Attorney, Agent, or Firm* — HEA Law PLLC; Darrin A. Auito

(57) ABSTRACT

An adjusting method to adjust dispensing of at least one chemical product in a circulation hydraulic circuit having one or more branches (230, 240, 250), wherein at least one dispensing device (D1, D2, D3) is configured to dispense, when activated, at least one respective chemical product in the circulation hydraulic circuit. The method includes detecting liquid flow rates in respective branches of the circuit through respective flow rate sensor devices (F1, F2, F3). If a regular condition occurs, then an activation of the at least one dispensing device is enabled. If an error condition occurs, then an activation of the at least one dispensing device is inhibited for a restoration time (T), wherein at least one detected liquid flow rate causing the error condition is restored to a value not lower than a respective flow rate threshold value plus an additional inhibition time associated to at least one flow rate sensor device.

15 Claims, 2 Drawing Sheets

(52) U.S. Cl.
CPC .. *C02F 2209/003* (2013.01); *C02F 2209/006* (2013.01); *C02F 2209/40* (2013.01); *C02F 2301/046* (2013.01)

(56) References Cited

U.S. PATENT DOCUMENTS

2018/0093911 A1* 4/2018 Dove ...................... C02F 3/345
2018/0186656 A1* 7/2018 Drewniak ............... C02F 5/145

* cited by examiner

ADJUSTING METHOD AND SYSTEM FOR DISPENSING CHEMICAL PRODUCTS

CROSS REFERENCE TO RELATED APPLICATIONS

This application is a National Stage of International Application No. PCT/IB2017/056897 filed on Nov. 3, 2017, claiming priority to 102016000110606 filed on Nov. 3, 2016. The contents of the above documents are incorporated herein by reference in its entirety.

The present invention refers to an adjusting method and system for dispensing one or more chemical products in a hydraulic circuit, in particular a method and a system for controlling dispensing one or more chemical products in a circulation circuit of a swimming pool.

Although in the following reference will be mainly made to a circulation circuit of a swimming pool, it must be understood that the method and system according to the invention may be also applied to different hydraulic circuits, such as for instance hydraulic circuits, in particular circulation circuits, of bathtubs, hot tubs, hydromassage tubs and therapeutic tubs, still remaining within the scope of protection as defined in the attached claims.

The water of a swimming pool is usually taken from the water pipeline and therefore has hygienic/bacteriological characteristics suitable for guaranteeing the safety of bathers. For economic and environmental reasons, it is not possible to continuously empty and fill the swimming pool, and therefore hydraulic circuits, so-called "circulation circuits", are provided along which filtering devices and water disinfection devices are positioned, in order to guarantee the required hygienic characteristics.

For instance, the circulation is ensured by collecting water on drains placed at the perimeter edge of the swimming pool that then pours into a tank, called "compensation tank". It is then sucked from this by the filtration and disinfection system and subsequently sent to the swimming pool. In fact, the function of the circulation is to recover water from the pool, send it to the filtration, disinfect it and then put it back into the swimming pool.

Regardless of the volume of the swimming pool and the number of users, water must constantly maintain hygiene characteristics suitable for bathing to prevent the risk of infections for users during activity in water. The risk of infection also occurs due to the presence of micro-organisms introduced by the same bathers as well as to the stagnation of the water itself. In order to limit this risk, it is necessary to guarantee a residual disinfectant value in the water of the swimming pool.

In the prior art, the use of dosing pumps is provided for the introduction into the hydraulic circuit of chemical products for adjusting some parameters of the water contained in the swimming pool, for instance pH and/or chlorine percentage. The dosing pumps which are used are usually automatic and controlled by an electronic control unit. The electronic control unit collects data concerning the actual presence of water in correspondence with a so-called "hydraulic module", in which a small portion of the water flowing through the circulation circuit is caused to pass and which usually comprises a plurality of detection probes configured to detect chemical-physical parameters of the water coming from the compensation tank, such as the concentration of one or more substances dissolved in the water and/or the pH value and/or the oxidation-reduction potential and/or the water conductivity; on the basis of the detections received from the detection probes, the electronic control unit is configured to control the dosing pumps dispensing the chemical products to maintain the hygienic/bacteriological conditions of the water suitable to guarantee the safety of the bathers.

The systems which are used also have circulation pumps which are kept in operation during the day to ensure adequate shuffling of water. When the swimming pool is not operating, for instance at nighttime, the circulation is usually reduced to minimal conditions, leaving only one of the circulation pumps on or reducing the flow (i.e. the flow rate). In some cases, all the circulation pumps are also turned off, although it is preferable to avoid this to prevent water stagnation phenomena.

A disadvantage of the prior art systems is that in the event of a decrease in the flow rate of water present in the system, the circulating chemical product(s) percentage increases causing undesirable effects in terms of overdose which entails the risk of damages and costs, both due to the need for maintenance of the system itself, and in terms of waste material and environmental damages. Even in correspondence with a configuration of turned off pumps, the system still detects the presence of a minimum flow enabling the chemical product dosage with consequent stagnation of the product itself.

In fact, in known systems, the hydraulic module is usually positioned in positive suction head position and therefore it remains in a filled condition even in the absence of water flow in the system. Even in conditions of limited flow rate, known systems thus operate as if they were in normal conditions of use of the swimming pool, dispensing an unnecessary amount of chemical product.

In the absence of circulation, the exceeding product is not put into circulation to spread in the swimming pool thus causing a stagnation of the dispensed chemical product, usually in the circulation circuit.

A further disadvantage of prior art systems is that in the case where chemical product stagnation occurs in the duct, the detection probes, positioned in the hydraulic module, do not detect any overdosing since the exceeding chemical product remains in the pipelines and is not put in circulation. Therefore, overdosing is not detected and the system will continue to dispense the chemical product until a pre-set time threshold value (so-called "Over Feed Alarm") is reached.

A further disadvantage of prior art systems is that, once the circulation pumps have been restarted, the chemical product present in the ducts will be mixed in the swimming pool causing a sudden overdose of chemical product.

Some prior art solutions are described in documents WO 2011/143736 A1 and US 2009/0200245 A1. These solutions also have further disadvantages, mainly due to the fact that they are not easily adaptable to different configurations and types of hydraulic circuit.

Therefore, the technical problem solved by the present invention is to provide a method and a system for adjusting dispensing which allow to overcome the drawbacks mentioned above with reference to the prior art.

This problem is solved by a method and a system according to the independent method and system claims, respectively.

Preferred features of the present invention are present in the dependent claims thereof.

Advantageously, the method and the related system according to the present invention allow in a simple, reliable, efficient and inexpensive way to drastically reduce the possibilities of error in dosing and the chemical product waste during circulation operations of a swimming pool, the method and the system resulting flexible and easily adaptable to different configurations and types of hydraulic circuit, due for example to different volumes of water (or other liquid), ducts of different length and/or cross-section, circuits with portions having pressure drops.

Another advantage of the present invention is that chemical product dispensing takes place automatically, reducing the need for control by an operator.

A further advantage is that dispensing chemical product in the proper percentage, i.e. in the amount necessary for sanitation of the swimming pool water, ensures the safety of users avoiding the dangers that could result from an overdose of the product in the swimming pool water.

A still further advantage of the method and the related system according to the present invention is the possibility of preserving the integrity of the circulation system and reducing the need for manual maintenance interventions, thus reducing the process costs and avoiding the possibility of environmental damages.

Other advantages, features and modes of use of the present invention will be evident from the following detailed description of some embodiments, presented by way of example and not by way of limitation.

The present invention will be now described, by way of illustration and not by way of limitation, according to its preferred embodiments, by particularly referring to the Figures of the annexed drawing, in which.

Figure 1:
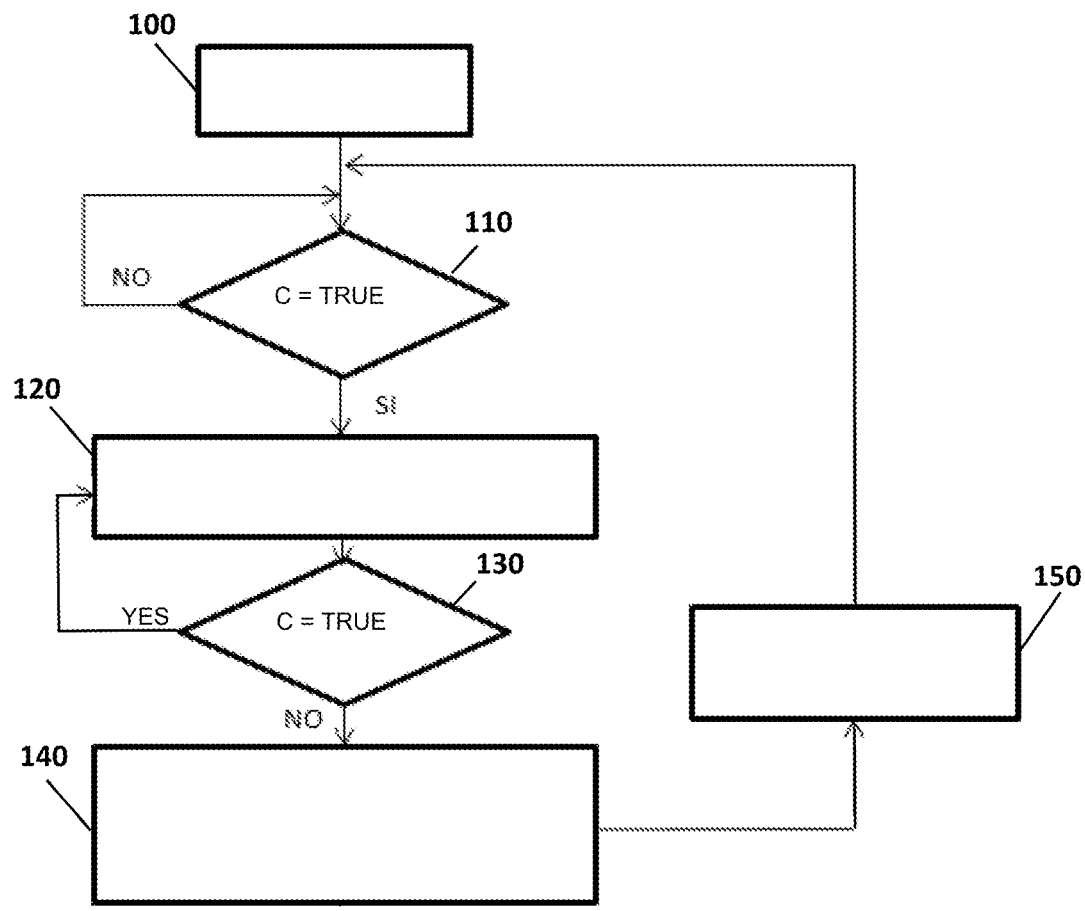
FIG. 1 shows a flowchart of a preferred embodiment of the method for adjusting dispensing of one or more chemical products in a hydraulic circuit according to the present invention.

The adjustment system shown in FIG. 1 is applied to a circulation circuit of a swimming pool 200, comprising a compensation tank 210 connected through drains 220 to the swimming pool 200. The compensation tank 210 is connected, through an outlet duct 230, to the circulation hydraulic circuit comprising a primary branch 240 and a secondary branch 250 connected in parallel between the outlet duct 230 and an inlet duct 260 that connects the circulating hydraulic circuit to the swimming pool 200. The primary branch 240 is provided with a respective (primary) circulation pump P1 downstream of which a filter FS2, optionally a sand filter, is advantageously positioned; similarly, the secondary branch 250 is provided with a respective (secondary) circulation pump P2 downstream of which a filter FS1, optionally a sand filter, is advantageously positioned. The circulation pumps P1 and P2 can be of a known type.

It must be noted that the compensation tank 210 is an optional feature of the system according to the invention, so that in other embodiments this tank may be missing, still remaining within the scope of protection of the present invention, as defined in the attached claims. Also, it must be noted that the filters are optional features of the system according to the invention, so that in other embodiments the filters may be missing in some or all the branches of the circulation circuit, still remaining within the scope of protection of the present invention, as defined in the attached claims.

During circulation of water in the circulation circuit, caused by the operation of at least one of the circulation pumps P1 and P2, water is removed from the compensation tank 210, and consequently from the swimming pool 200, it flows from the outlet duct 230 to at least one of the primary and secondary branches 240 and 250 of the circulation hydraulic circuit, and from this to the inlet duct 260 to return to the swimming pool 200.

Conventionally, the adjusting system according to the invention comprises a plurality of detection probes (not shown in the Figures) configured to detect one or more chemical-physical parameters of the water flowing in the circulation circuit, advantageously in the primary branch 240 upstream of the FS2 filter; by way of example and not by way of limitation, said one or more chemical-physical parameters can be selected from the group of parameters comprising or consisting of: the water flow (in the primary branch 240), the concentration of one or more chemical products dissolved in water, the concentration of one or more substances dissolved in water, the pH value, the oxidation-reduction potential, and the water conductivity.

The adjusting system according to the invention further comprises a processing unit CU that, on the basis of the detections received from the detection probes, is configured to control one or more dispensing devices configured to dispense respective chemical products (in FIG. 2 three dispensing devices D1, D2 and D3 are shown by way of example), optionally in the inlet duct 260, activating these dispensing devices for dispensing the respective chemical products, or not, to maintain the hygienic/bacteriological conditions of water suitable for guaranteeing the safety of the users of the swimming pool 200 (for instance, maintaining one or more chemical-physical parameters equal to respective preset reference values, also called setpoints). For instance, in correspondence with a detected concentration value of a specific chemical product different from a reference value (setpoint) of the concentration of such chemical product, an activation signal can be sent from the processing unit CU to the specific chemical product dispensing device.

Figure 2:
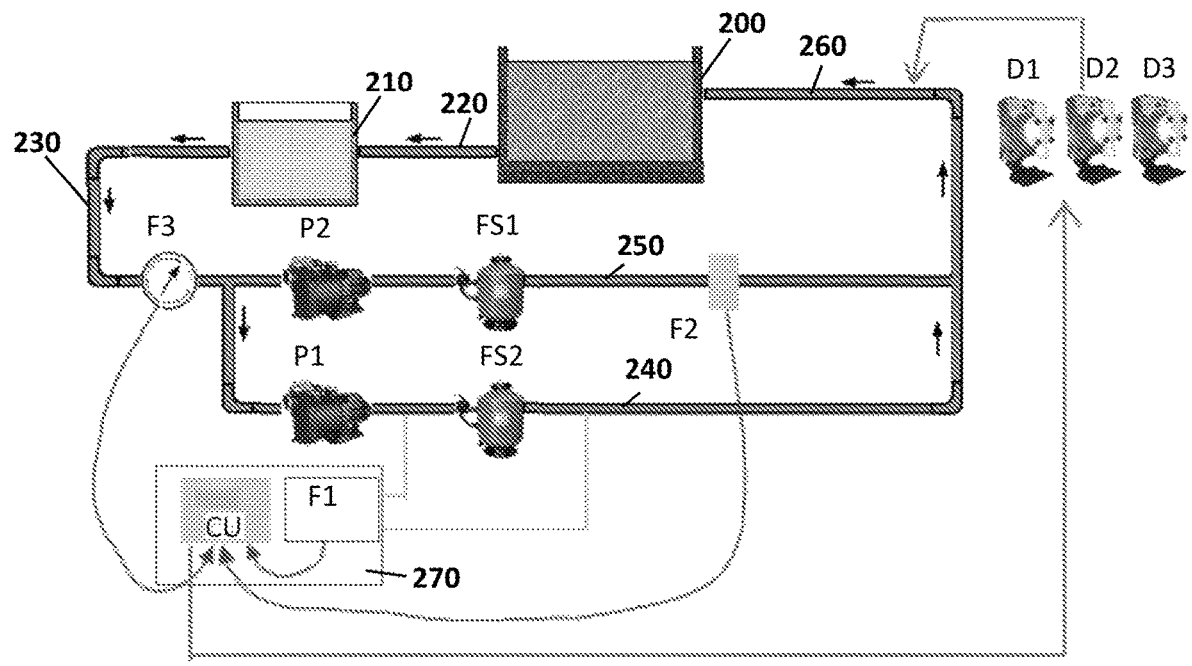
FIG. 2 shows a schematic representation of an adjusting system configured to perform an embodiment of the method according to the present invention.

Optionally, as shown in FIG. 2, the processing unit CU is mounted on a hydraulic module 270 on which the detection probes and a (primary) flow rate sensor F1 are also housed, optionally connected to each other in a cascade configuration, wherein the (primary) flow rate sensor F1 is configured to detect the flow in the primary branch 240. In particular, in the derivation of the (cascade of the sensor F1 and detection probes housed in the) hydraulic module a small portion of the water flowing in the primary branch 240 of the circulation circuit is caused to pass, that is fed back into the primary branch 240 downstream of the filter FS2, optionally after having been filtered by a small filter (not shown) also mounted on the hydraulic module 270; alternatively, the water flowing in the hydraulic module can be re-introduced into the primary branch 240 upstream of the filter FS2.

Furthermore, the adjustment system according to the invention shown in FIG. 2 further comprises a (secondary) flow rate sensor F2 positioned on the secondary branch 250 of the circulation circuit, that is configured to detect the flow in the secondary branch 250, and a third flow rate sensor F3 positioned in the outlet conduit 230, i.e. upstream of the primary and secondary branches 240 and 250 of the circulation circuit, that is configured to detect the flow in the outlet duct 230 (that enters the circulation circuit).

In addition to controlling the dispensing devices D1, D2 and D3, the processing unit CU is configured to perform the adjustment method according to the invention wherein the activation of the dispensing devices D1, D2 and D3 is conditioned by the flow rate values detected by the sensors F1, F2 and F3. In particular, although represented by a single block, those skilled in the art will appreciate that the functions of the processing unit CU may be distributed over a plurality of computing units cooperating with each other.

In particular, in correspondence with a potential activation of a dispensing device D1, D2 or D3, and thus of a detected need for dispensing the respective chemical product, the method according to the present invention has a step of detecting the flow rate of water (more in general of liquid) in the circulation hydraulic circuit. By way of example, and not by way of limitation, in the case where a concentration value of a specific chemical product different from a preset reference concentration value (setpoint) is detected, for example a value lower than (or not higher than) the preset reference concentration value (in this case the setpoint operates as threshold value), before allowing the chemical product to be dispensed by activating the respective dispensing device, the method according to the invention has a step of detecting liquid flow rate in the hydraulic circuit through one or more out of, advantageously all, the flow rate sensors F1, F2 and F3.

In the case where, in at least one branch of the circulation hydraulic circuit, a liquid flow rate value is detected that is at least equal to (i.e. a value not lower, or alternatively a value higher than) a preset flow rate threshold value (optionally dependent on the specific branch in which the flow rate is detected), the step of dispensing the chemical products for which a dispensing need has been detected (by the detection probes) is enabled, by activating one or more of the dispensing devices D1, D2 and D3; in particular, the chemical products can be selected from the group comprising or consisting of pH-regulating products, chlorine-regulating products, anti-algae products, and sanitizing and/or disinfecting products.

The dispensing step has a conventional time duration that is preset by an operator considering the detected values of one or more chemical-physical parameters of water, the size of the swimming pool, the size of the circulation system, the positioning of the dispensing pumps and the liquid volumes to be treated.

Otherwise, in the case where, in at least one branch of the circulation hydraulic circuit, a liquid flow (i.e. flow rate) equal to zero or in any case lower (or not higher) than the preset flow rate threshold value is detected, the chemical product dispensing step is inhibited.

In particular, the inhibition step has a time duration equal to a restoration time T of the liquid flow rate value in at least one branch of the circulation hydraulic circuit, plus an additional inhibition time (T1; T2; T3) that is characteristic of the sensor devices used for detecting the liquid flow rate value, as well as of the characteristics of the duct (e.g., length, cross-section, presence of pressure drops) in which the liquid the flow rate of which is detected flows. In particular, the restoration time T is variable as a function of the times necessary to the hydraulic circuit to restore a regular flow rate condition starting from a specific occurrence of a condition of flow rate lower (or not higher) than the preset flow rate threshold value.

In an alternative embodiment, the inhibition step can be activated manually by an operator, for instance in conditions of circulation system stall or error of the processing unit CU or of a different system control unit.

Advantageously, the described method allows to diversify the actions based on the cause of the problem detected through the use of the sensors F1, F2 and F3.

In particular, in an embodiment of the present invention, the sensor F2 is a flow based switch, i.e. a boolean detector of a given water flow, made through an electro-mechanical contact, for instance made through a Reed sensor. In general, this type of sensor allows to make a quantitative measurement of the water flow. As shown in FIG. 2, in a preferred embodiment this sensor F2 is positioned on the secondary branch 250 downstream of the (secondary) pump P2 (and optionally downstream of the filter FS1) so as to detect whether the (secondary) pump P2, in the secondary branch 250 of the circulation circuit, is causing at least a determined instant amount of water, optionally set by the operator, to flow or not. In this way, by means of a boolean signal that is transmitted to (and processed by) the processing unit CU, it is checked whether the (secondary) pump P2 of the secondary branch 250 of the circulation circuit is actually operating or turned off or operating at reduced flow rate (through a comparison with a flow threshold value preset by an operator).

Moreover, in the preferred embodiment, the third flow rate sensor F3 is a flow meter, i.e. a water instant flow rate meter, for instance a rotary vane flowmeter. In this way, through a related signal that is transmitted to (and processed by) the processing unit CU, a value of the overall flow rate of water flowing into the circulation circuit of the swimming pool 200 is measured. For instance, through said flow meter F3, it is checked whether in the circulation circuit having the primary branch 240 and the secondary branch 250 (as shown in FIG. 2), and respective primary and secondary circulation pumps P1 and P2, a liquid flow value necessary to guarantee a correct circulation in all operating conditions is guaranteed, i.e. with both primary and secondary pumps P1 and P2 operating at full flow rate, with one or two of the primary and secondary pumps P1 and P2 operating at reduced flow rate, and/or with only one primary or secondary pump P1 or P2 operating.

It must be noted that, in a similar manner, the invention continues to be valid even in the case where the sensor F2 is a flow meter and the sensor F3 is a flow based switch, or where both are flow meters or flow based switches.

In the preferred embodiment of the system according to the invention, also the primary sensor F1 is a flow based switch, i.e. a boolean indicator of a determined water flow in the primary branch 240 of the circulation hydraulic circuit, made with magnetic contact and a hydraulic flow regulator present in the hydraulic module. The primary sensor F1 allows to detect a water flow value in the primary branch 240 of the circulation hydraulic circuit and therefore to ensure, through a still further boolean signal that is transmitted to (and processed by) the processing unit CU, the comparison of the value detected with a preset threshold value suitable for ensuring correct measurements of the water chemical-physical parameters of the swimming pool 200 by the detection probes (housed in the hydraulic module 270).

The flow based switch F1 is functional to the attestation of the validity of the chemical-physical parameters detected by the detection probes and in general to the measurements made in the system, therefore in the case where a flow problem is detected through the primary sensor F1, the system inhibits all dosages of the chemical products.

Advantageously, each one of the flow rate sensors F1, F2 and F3 can generate an event, for instance an error condition, to inhibit the dosing of at least one respective chemical product inside the swimming pool 200. As shown in FIG. 1, the inhibition step has a duration equal to the restoration time T (generally variable and equal to the time interval that passes from the moment at which an alarm, or an error condition, related to a specific sensor occurs to the moment at which a regular flow rate condition is restored) added to an additional inhibition time (T1; T2; T3). In the inhibition step, dispensing of the chemical product is inhibited for a duration equal to the restoration time T plus the additional time T1, T2 or T3 the duration of which depends on the type of sensor, as well as on the characteristics of the duct, e.g., length, cross-section, presence of pressure losses, in which the liquid the flow rate of which is detected flows, that first detects an error condition, as will be better specified later.

In an alternative embodiment, the duration of the additional time depends on the type of the specific sensor that has generated the error condition, on the specific type of hydraulic system of the swimming pool and on the specific point in the hydraulic system in correspondence of which the sensor is located.

For instance, the occurrence of an error condition detected by the primary sensor F1 is indicated with ERR1, therefore ERR1=TRUE if the flow in the primary branch 240 of the circulation circuit detected by the primary sensor F1 is below a preset value. In particular, an error condition of the primary sensor F1 when this is a flow based switch, optionally made through a Reed sensor, is recognized when the position of a float below a preset minimum position (equal to a preset minimum flow value) is detected. T1 indicates the additional inhibition time related to the specific primary sensor F1, also indicated in the following as startup time, for instance equal to the time necessary to the system to restore the steady state conditions in correspondence of the sensor F1, or for instance equal to the time necessary to the primary sensor F1 to pass from a startup configuration to an operating configuration.

The dispensing of the chemical products inside the swimming pool is therefore inhibited for a restoration time T (equal to the duration of the error condition) plus an additional time T1 (characteristic of the specific primary sensor F1 as well as of the characteristics of the duct on which the primary sensor F1 is mounted) starting from the time at which the primary sensor F1 returns from an alarm or error condition.

It is also indicated with ERR2 an error condition generated by the secondary sensor F2, for instance ERR2=TRUE if the flow in the secondary branch 250 detected by the secondary sensor F2 is below a preset value. In particular, an error condition of the secondary sensor F2, when this is a flow based switch, comprises a detection of a flow rate value lower than a preset minimum value (equal to a preset flow rate threshold value). T2 indicates the additional inhibition time related to the specific secondary sensor F2 (as well as to the characteristics of the duct on which the secondary sensor F2 is mounted), i.e. the startup time of the secondary sensor F2, for instance equal to the time necessary to the system to restore the steady state conditions in correspondence of the secondary sensor F2, or for instance equal to the time necessary to the secondary sensor F2 to pass from a startup configuration to an operating configuration.

The dispensing of the chemical products inside the swimming pool is therefore inhibited for a restoration time T (equal to the duration of the error condition) plus an additional time T2 (characteristic of the specific secondary sensor F1 as well as of the characteristics of the duct on which the secondary sensor F2 is mounted) starting from the time at which the secondary sensor F2 returns from an alarm or error condition.

Moreover, ERR3 indicates an error condition generated by the third sensor F3, for instance ERR3=TRUE if the liquid flow detected in the outlet duct 230 (i.e. upstream of the primary and secondary branches 240 and 250 of the circulation circuit) by the third sensor F3 is lower than a determined reference flow value (which reference flow value, so-called setpoint, is preset). T3 indicates the additional inhibition time related to the specific sensor F3 (as well as to the characteristics of the duct on which the third sensor F3 is mounted), i.e. the startup time of the third sensor F3, for instance equal to the time necessary to the system to restore the steady state conditions in correspondence of the third sensor F3, or for instance equal to the time necessary to the third sensor F3 to pass from a startup configuration to an operating configuration.

The dispensing of the chemical products inside the swimming pool 210 is therefore inhibited for a restoration time T (equal to the duration of the error condition) plus an additional time T3 (characteristic of the specific third sensor F3 as well as of the characteristics of the duct on which the third sensor F3 is mounted) starting from the time at which the third sensor F3 returns from an alarm or error condition.

Advantageously, the sensors F1, F2 and F3 are continuously monitored to check whether at least one of the sensors is in an error condition. An alternative embodiment has a discontinuous monitoring of the sensors F1, F2 and F3, for instance a monitoring with predetermined time frequency.

FIG. 1 shows a schematic block diagram of a preferred embodiment of the method according to the invention performed by the processing unit CU of the system of FIG. 2. In particular, in step 100 the conventional operation of the processing unit CU is started, receiving detections of the chemical-physical parameters from the detection probes and, on the basis of such detections, controlling the dispensing devices D1, D2 and D3. However, the processing unit CU simultaneously performs the method according to the invention. The condition C=ERR1 OR ERR2 OR ERR3 is therefore checked through step 110 of monitoring the sensors F1, F2 and F3. In the case where an error condition occurs even only for one of the sensors F1, F2 and F3, then the condition C is true and the processing unit CU perform step 120 wherein it interrupts the chemical product dispensing process and signals, for instance through activation of luminous and/or acoustic signaling devices, the existence of an alarm condition. Such alarm condition persists as long as the condition C is true, thanks to the execution of step 130 of checking the value of the condition C.

From the moment at which the possible error condition of each sensor F1, F2 and F3 is corrected and hence the correct operation of the circulation circuit is restored, that is from the moment at which the condition C is false, step 140 is performed where the inhibition of chemical product dispensing lasts for an additional time T1, T2 or T3, characteristic of the sensor F1, F2 or F3 (as well as of the characteristics of the duct on which this sensor is mounted) that is considered more characterizing for the correct operation of the circulation circuit of the swimming pool 200 and that is first detected in the relationship representing the condition C.

For instance, in the aforesaid case the possible error condition that is first checked is ERR1, the error condition of the primary sensor F1, hence in the case where the ERR1 condition is true, the inhibition of the dosage will be maintained for a restoration time T plus an additional time T1 characteristic of the specific primary sensor F1 (as well as of the characteristics of the duct on which this sensor is mounted). The dosage inhibition would have had the same duration even if a further error condition had occurred simultaneously with ERR1, for example ERR2, since in the relationship representing the condition C itself a priority on the check of errors is defined (therefore, in the relationship C=ERR1 OR ERR2 OR ERR3, the ERR1 condition has priority over the other error conditions and, as already described above, is checked first).

In a further operational situation, if the ERR1 condition were not present but only the ERR2 one, then the additional time of dosage inhibition would have been T2 that is characteristic of the specific sensor F2 (as well as of the characteristics of the duct on which the sensor is mounted). Furthermore, if the ERR2 and ERR3 conditions were been simultaneously present, the additional inhibition time would have been T2 (because in the relationship representing the condition C=ERR1 OR ERR2 OR ERR3 the ERR2 condition has priority over ERR 3).

If, in a further operational situation, only the ERR3 condition were present, the additional inhibition time would be T3.

In an alternative embodiment, the method according to the present invention provides for the check of the sensor F3 before checking the sensor F1. In this case the relationship C=ERR3 OR ERR2 OR ERR1 is therefore checked, thus the dosage inhibition will be maintained for a restoration time T plus an additional time T3 characteristic of the specific sensor F3 (as well as of the characteristics of the duct on which this sensor is mounted).

The possible correlations can be obviously multiple depending on the different case cases and specific system needs.

Once the inhibition phase 140 for the additional time is ended, the method performs step 150 wherein the possible activation of the dispensing devices D1, D2 and D3 is re-enabled and it returns to step 110. Optionally, before step 140, the method could perform a further step of monitoring the sensors F1, F2 and F3, checking the condition C=ERR1 OR ERR2 OR ERR3, and, in the case where an error condition occurs for which the condition C is true, the method returns to perform step 120, otherwise it performs step 150.

In particular, the method according to the invention enables or disables the activation of the dispensing devices D1, D2 and D3 irrespective of whether the processing unit CU recognizes the actual need to activate such dispensing devices D1, D2 and D3 or not.

Discriminating the additional inhibition times T1, T2 or T3, characteristic of a specific sensor F1, F2 or F3, can be very useful because, depending on the point of the system where the flow problem occurs, it may be necessary to wait for a longer or shorter time before returning to the normal dosage of chemical product.

The characteristic of possibly configuring (i.e. adjusting) the additional times T1, T2, and T3, advantageously allows an optimisation of the restoration times of the circulation system following, for instance, a voluntary shutdown or an unexpected block. Also, this further allows to render the method and the system according to the invention flexible and easily adaptable to different configurations and types of hydraulic circuit, due for instance to different volumes of water (or other liquid), ducts of different length and/or cross-section, circuits with portions having pressure drops.

In fact, depending on the specific system needs, it is possible to configure the sensors F1, F2, and F3 so that they have the same value of additional time T1, T2, and T3, respectively, or, alternatively, so as to set a value of additional time different for each sensor F1, F2, and F3.

A check of the error condition of the sensor having the longest restoration time is convenient in the case where it is desired to work in safe conditions and to ensure that the whole system is in steady state at the moment when the chemical product dispensing is restored, for instance in large systems with very high inertia. Alternatively, a check of the error condition of the sensor having the shortest restoration time is convenient where it is desired to work in conditions of rapid restoration of the system steady state conditions, for instance in small size swimming pools and circulation systems where the system can be restored faster.

Optionally, the expiry of the additional time T1, T2 or T3 in step 140 can be computed by the processing unit CU through a conventional decrement of a register initialized to the additional inhibition time, whereby, when such register reaches a zero value, step 150 is performed.

Therefore, if the liquid flow in a circulation system of a swimming pool 200 is interrupted or decreased for any reason (for instance due to a fault, a malfunction of a circulation pump, or simply the shutdown of the swimming pool in conditions of non-use) also the dispensing of the chemical products in the circulation system is interrupted, and then it automatically resumes (although the possibility of a manual resumption is not excluded) after a restoration time adjustable according to the specific dimensional characteristics of the system. In this way, advantageously, even in case of malfunction, the optimum and strictly necessary chemical product dispensing is always guaranteed, hence neither higher nor lower than the quantity required for an efficient operation of the circulation system of a swimming pool.

Conventionally, in case of reduced flow in the circulation circuit, for instance at nighttime, and in the absence of error conditions from the flow rate sensors F1, F2 and F3, the processing unit CU can control the dispensing devices D1, D2 and D3 so as to dispense proportionally reduced doses of chemical products.

The present invention also comprises an implementation of the described method through a computer program.

Advantageously, the computer program can be stored in a memory medium, for instance readable through a programmable electronic device.

Moreover, the computer program can be implemented by developing a software that can be supported by any programmable electronic device.

The preferred embodiments of this invention have been described and a number of variations have been suggested hereinbefore, but it should be understood that those skilled in the art can make other variations and changes without so departing from the scope of protection thereof, as defined by the attached claims.

The invention claimed is:

1. An adjusting method to adjust dispensing of at least one chemical product in a circulation hydraulic circuit having one or more branches, wherein at least one dispensing device is configured to dispense, when activated, at least one respective chemical product in the circulation hydraulic circuit, comprising the step of:

detecting one or more liquid flow rates in one or more respective branches of the circulation hydraulic circuit through one or more respective flow rate sensor devices, wherein:

if a regular condition occurs wherein said one or more liquid flow rates detected in said one or more respective branches of the circulation hydraulic circuit are not lower than respective flow rate threshold values, an activation of said at least one dispensing device is enabled, and if an error condition occurs that is caused by at least one of said one or more liquid flow rates detected in at least one respective branch of said one or more respective branches of the circulation hydraulic circuit that is lower than a respective flow rate threshold value, an activation of said at least one dispensing device is inhibited for a time duration equal to a restoration time wherein said at least one detected liquid flow rate causing said error condition is restored to a value not lower than said respective flow rate threshold value plus an additional inhibition time associated to at least one of said one or more flow rate sensor devices, wherein said additional inhibition time is a startup time for said one or more flow rate sensor devices, equal to the time necessary to restore steady state conditions for said one or more flow rate sensor devices, or equal to the time necessary for said one or more flow rate sensor devices to pass from a startup configuration to an operating configuration.

2. The adjusting method according to claim 1, wherein said additional inhibition time is associated to at least one flow rate sensor device that has detected said error condition.

3. The adjusting method according to claim 1, wherein the circulation hydraulic circuit has two or more branches in which two or more flow rate sensor devices detect two or more respective liquid flow rates, a respective startup time being associated to each one of said two or more flow rate sensor devices, and wherein said additional inhibition time is equal to the longest of said startup times associated to said two or more flow rate sensor devices.

4. The adjusting method according to claim 1, wherein the circulation hydraulic circuit has two or more branches in which two or more flow rate sensor devices detect two or more respective liquid flow rates, a respective startup time being associated to each one of said two or more flow rate sensor devices, and wherein said additional inhibition time is equal to the shortest of said startup times associated to said two or more flow rate sensor devices.

5. The adjusting method according to claim 1, wherein at least one flow rate sensor device is a flow based switch or a flow meter.

6. An adjusting system configured to adjust dispensing of at least one chemical product in a circulation hydraulic circuit having one or more branches, comprising:
  at least one dispensing device configured to dispense, when activated, at least one respective chemical product in the circulation hydraulic circuit;
  one or more flow rate sensor devices configured to detect a flow rate value in said one or more branches of the circulation hydraulic circuit; and
  a processing unit configured to perform an adjusting method to adjust dispensing of said at least one chemical product comprising the step of:
  detecting one or more liquid flow rates in one or more respective branches of the circulation hydraulic circuit through said one or more respective flow rate sensor devices, wherein:
  if a regular condition occurs wherein said one or more liquid flow rates detected in said one or more respective branches of the circulation hydraulic circuit are not lower than respective flow rate threshold values, an activation of said at least one dispensing device is enabled, and
  if an error condition occurs that is caused by at least one of said one or more liquid flow rates detected in at least one respective branch of said one or more respective branches of the circulation hydraulic circuit that is lower than a respective flow rate threshold value, an activation of said at least one dispensing device is inhibited for a time duration equal to a restoration time wherein said at least one detected liquid flow rate causing said error condition is restored to a value not lower than said respective flow rate threshold value plus an additional inhibition time associated to at least one of said one or more flow rate sensor devices, wherein said additional inhibition time is a startup time for said one or more flow rate sensor devices, equal to the time necessary to restore steady state conditions for said one or more flow rate sensor devices, or equal to the time necessary for said one or more flow rate sensor devices to pass from a startup configuration to an operating configuration.

7. The adjusting system according to claim 6, wherein said additional inhibition time is associated to at least one flow rate sensor device that has detected said error condition.

8. The adjusting system according to claim 6, wherein the circulation hydraulic circuit has two or more branches in which two or more flow rate sensor devices detect two or more respective liquid flow rates, a respective startup time being associated to each one of said two or more flow rate sensor devices, and wherein said additional inhibition time is equal to the longest of said startup times associated to said two or more flow rate sensor devices.

9. The adjusting system according to claim 6, wherein the circulation hydraulic circuit has two or more branches in which two or more flow rate sensor devices detect two or more respective liquid flow rates, a respective startup time being associated to each one of said two or more flow rate sensor devices, and wherein said additional inhibition time is equal to the shortest of said startup times associated to said two or more flow rate sensor devices.

10. The adjusting system according to claim 6, wherein at least one flow rate sensor device is a flow based switch or a flow meter.

11. A non-transitory computer readable medium storing instructions which, when executed by a processing unit, causes said processing unit to perform an adjusting method to adjust dispensing of at least one chemical product in a circulation hydraulic circuit having one or more branches, wherein at least one dispensing device is configured to dispense, when activated, at least one respective chemical product in the circulation hydraulic circuit, comprising the step of:
  detecting one or more liquid flow rates in one or more respective branches of the circulation hydraulic circuit through one or more respective flow rate sensor devices, wherein:
  if a regular condition occurs wherein said one or more liquid flow rates detected in said one or more respective branches of the circulation hydraulic circuit are not lower respective flow rate threshold values, an activation of said at least one dispensing device is enabled, and
  if an error condition occurs that is caused by at least one of said one or more liquid flow rates detected in at least one respective branch of said one or more respective branches of the circulation hydraulic circuit that is lower than a respective flow rate threshold value, an activation of said at least one dispensing device is inhibited for a time duration equal to a restoration time wherein said at least one detected liquid flow rate causing said error condition is restored to a value not lower than said respective flow rate threshold value plus an additional inhibition time associated to at least one of said one or more flow rate sensor devices, wherein said additional inhibition time is a startup time for said one or more flow rate sensor devices, equal to the time necessary to restore steady state conditions for said one or more flow rate sensor devices, or equal to the time necessary for said one or more flow rate sensor devices to pass from a startup configuration to an operating configuration.

12. The non-transitory computer readable medium according to claim 11, wherein said additional inhibition time is associated to at least one flow rate sensor device that has detected said error condition.

13. The non-transitory computer readable medium according to claim 11, wherein the circulation hydraulic circuit has two or more branches in which two or more flow rate sensor devices detect two or more respective liquid flow rates, a respective startup time being associated to each one of said two or more flow rate sensor devices, and wherein said additional inhibition time is equal to the longest of said startup times associated to said two or more flow rate sensor devices.

14. The non-transitory computer readable medium according to claim 11, wherein the circulation hydraulic circuit has two or more branches in which two or more flow rate sensor devices detect two or more respective liquid flow rates, a respective startup time being associated to each one of said two or more flow rate sensor devices, and wherein said additional inhibition time is equal to the shortest of said startup times associated to said two or more flow rate sensor devices.

15. The non-transitory computer readable medium according to claim 11, wherein at least one flow rate sensor device is a flow based switch or a flow meter.

* * * * *